United States Patent [19]

de Jong

[11] Patent Number: 4,612,719

[45] Date of Patent: Sep. 23, 1986

[54] HOLDER FOR ELECTRONIC DETECTION ELEMENT, COMPRISING BAND ATTACHMENT WITH PULL FORCE PROTECTION

[75] Inventor: Hendrik J. de Jong, Groenlo, Netherlands

[73] Assignee: N.V. Nederlandsche Apparatenfabriek NEDAP, De Groenlo, Netherlands

[21] Appl. No.: 635,123

[22] Filed: Jul. 27, 1984

[30] Foreign Application Priority Data

Jul. 27, 1983 [NL] Netherlands ................ 8302684

[51] Int. Cl.⁴ .............................................. G09F 3/14
[52] U.S. Cl. .................................... 40/21 R; 119/106; 224/163
[58] Field of Search .............. 40/21 C, 21 R; 119/29, 119/106; 24/168, 170, 171, 191, 174; 224/163

[56] References Cited

U.S. PATENT DOCUMENTS

| 965,425 | 7/1910 | Warren | 24/168 |
|---|---|---|---|
| 1,265,324 | 5/1918 | Greene | 224/163 |
| 1,508,963 | 9/1924 | Dorf | 224/163 |
| 1,578,468 | 3/1926 | Rankin | 224/163 |
| 1,606,849 | 11/1926 | Spear | 224/163 |
| 2,442,266 | 5/1948 | Davis | 24/170 |
| 3,432,895 | 3/1969 | Nyberg et al. | 24/265 |
| 3,592,028 | 7/1971 | La Monica | 70/57 |
| 4,113,157 | 9/1978 | Woodbury | 224/163 |
| 4,165,033 | 9/1979 | Nielson et al. | 235/439 |
| 4,185,791 | 1/1980 | Takada | 242/107 |

FOREIGN PATENT DOCUMENTS

| 263303 | 10/1963 | Australia | 24/170 |
|---|---|---|---|
| 0023377 | 2/1981 | European Pat. Off. | |
| 2042043 | 4/1971 | Fed. Rep. of Germany | |
| 2222972 | 10/1974 | Fed. Rep. of Germany | |
| 74399169 | 11/1974 | Fed. Rep. of Germany | |
| 2817939 | 11/1978 | Fed. Rep. of Germany | |
| 2127269 | 10/1972 | France | |
| 7709183 | 2/1979 | Netherlands | 119/106 |
| 2487 | of 1908 | United Kingdom | 24/171 |
| 686380 | 1/1953 | United Kingdom | 24/170 |
| 1577920 | 10/1980 | United Kingdom | |

Primary Examiner—Robert P. Swiatek
Assistant Examiner—Cary E. Stone
Attorney, Agent, or Firm—Fleit, Jacobson, Cohn & Price

[57] ABSTRACT

A holder for an electronic detection element, which is adapted for attachment about the neck or other part of the body of an animal to be detected by a band. The holder is provided with a cavity for receiving the detection element and with at least one clamping member for adjustably clamping a band end.

15 Claims, 9 Drawing Figures

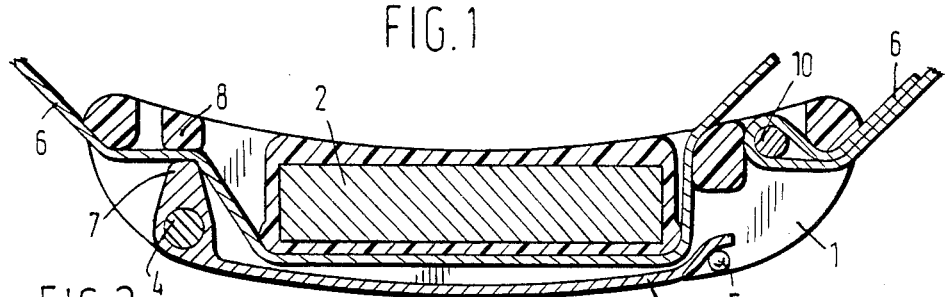
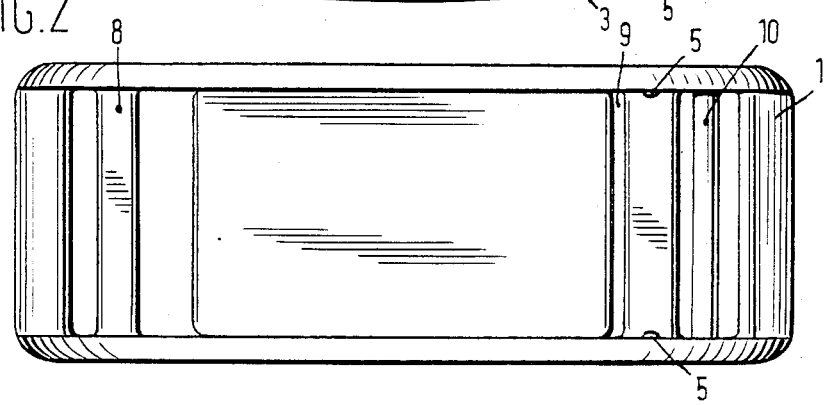
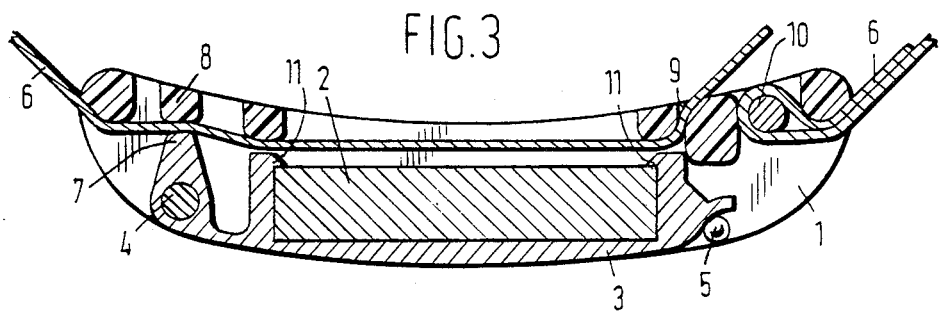
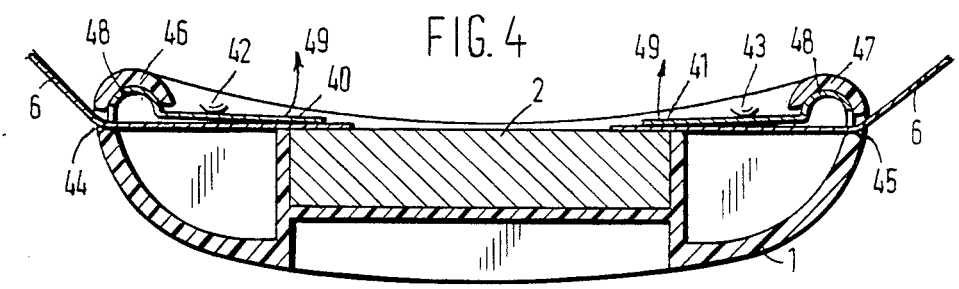

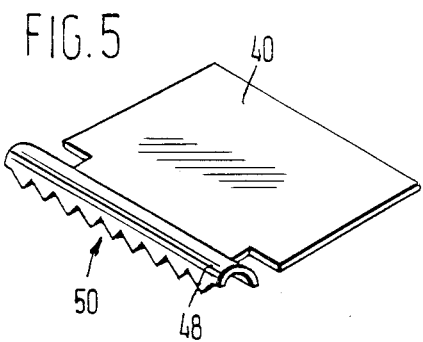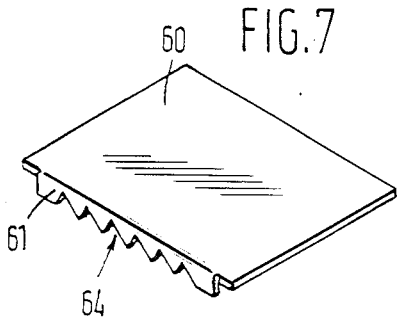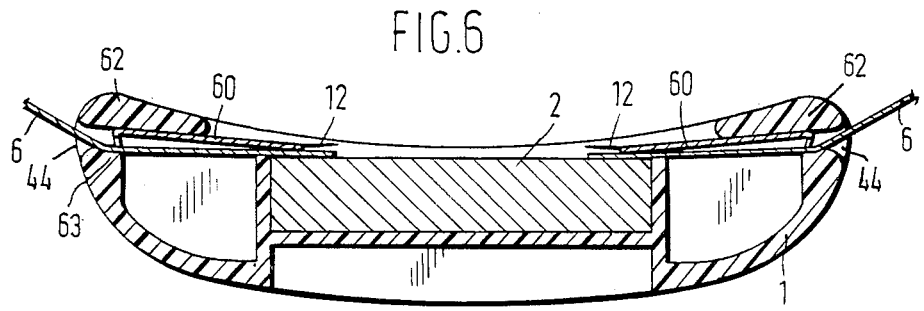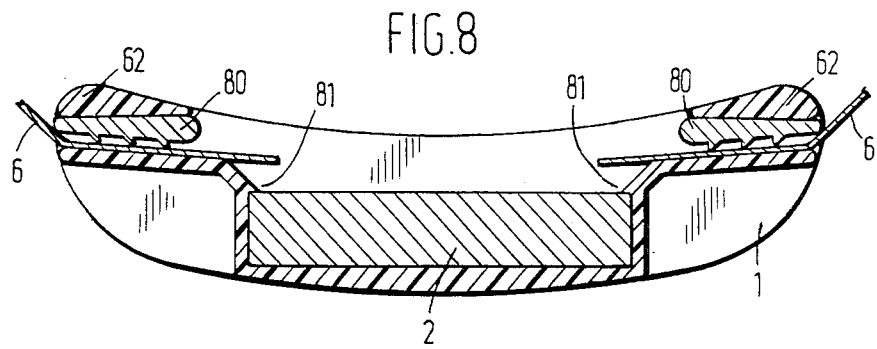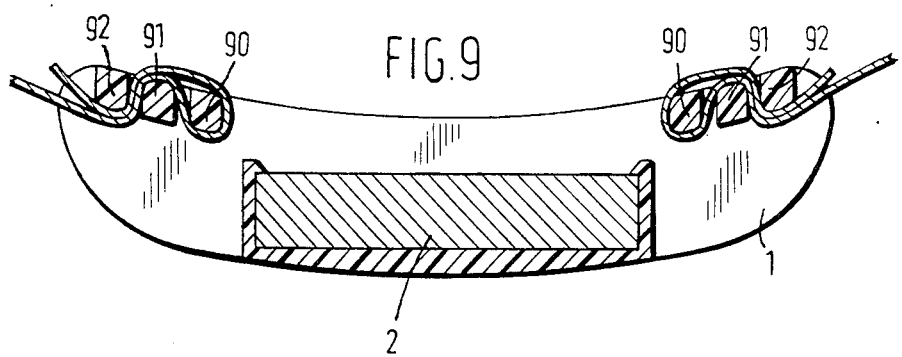

HOLDER FOR ELECTRONIC DETECTION ELEMENT, COMPRISING BAND ATTACHMENT WITH PULL FORCE PROTECTION

BACKGROUND OF THE INVENTION

The invention concerns a holder for an electronic detection element adapted to be attached by means of a band around the neck or around a different part of the body of an animal to be detected.

It is necessary for electronic identification that the object to be identified is provided with a detection element, sometimes referred to as responder. Such an element is disclosed e.g. in Dutch patent application No. 77,11891 of applicants, or their corresponding British patent No. 1,577,920.

It is conventional to embed such a detection element in a synthetic plastics holder, which is attached to a collar the two ends of which are subsequently buckled together. It is necessary now that the holder with the detection element always hangs in approximately the same place, preferably at the bottom of the neck of the animal, so that when the animal approaches the detection antenna, it will always bring the detection element at a predictable distance, at least within the range of the transceiver, in order to be identified with certainty. In practice, the holder with the detection element should have a given weight in order to be kept through gravity at the bottom of the neck of the animal. The weight of the holder with the detection element competes with the weight of the buckle often present at the top of the neck of the animal. In order to remain at the bottom of the neck, the holder with detection element should therefore have so much weight that the loosely fitting collar will not turn around the neck of the animal. This has resulted in rather heavy and voluminous holders, which, due to their volume, reached the required weight for compensating the counterweight of the buckle, but which became at the same time unnecessarily sensitive, due to their dimensions, to external damage caused by congeners of the animal or due to their being caught behind obstacles with which the animal comes into contact unconsciously or precisely very consciously in order to get rid of itching.

The miniaturization of the identification systems has meanwhile progressed to the extent that the last generation of detection elements have dimensions and weights that are a fraction of the versions hitherto conventional. It may then be considered to attach such a detection element in a different place in or on the body of the animal. Most of the animals to be identified, however, will keep their collars, even if such a different attachment place is possible, since one will wish to recognize the animal electronically but also visually, which is possible by applying a name and/or number on or about the collar.

If therefore, even though it is technically possible to install the detection element elsewhere, perhaps with a different, more expensive method, the animals will yet continue to wear collars in large numbers, it is advantageous to use said collar to install the miniaturized detection elements in a simple manner.

If the dimensions of the detection element are reduced from e.g. about 150×60×25 mm to about 60×35×12 mm or less in the near future, the problem of maintaining the detection element at the bottom of the neck of the animal will be felt more strongly, since the competing weight of the buckle on top of the neck will not or not appreciably decrease, while precisely the total weight of the detection element with the associated holder will strongly decrease.

SUMMARY OF THE INVENTION

It is an object of the invention to eliminate the above problems, to which effect a holder of the above-described type is characterized in that the holder is fitted with a cavity for receiving the detection element and with at least one clamping member for adjustably clamping a band end.

According to a further embodiment of the inventive idea, furthermore the integrated holder/buckle unit according to the invention may be fitted with a maximum band pull protection. This is necessary with many animals, since an animal, when being seized with the collar behind an obstacle, will try to break free. When the collar is made of a solid, wear-resistant material, substantial forces on the neck may be produced, with all detrimental effects thereof. To prevent this, the buckle can be constructed in such a manner that in exceeding a predetermined maximum band pull, it releases the band. In addition to being adapted to be embedded in the holder, the detection element according to the invention will also be embedded in a loose block and be replaceably installed in the holder/buckle. In case of damage to the holder/buckle, the relative expensive detection element, may then be transferred into another. It is also possible that the holder/buckle has a different form and/or colour for different dealers; the detection element may then always keep the same form and be effectively manufactured in large series.

BRIEF DESCRIPTION OF THE DRAWINGS

Some embodiments of the construction of the invention will now be described by way of example, with reference to the accompanying drawings, in which:

FIG. 1 is a longitudinal section of a first embodiment of a holder according to the invention;

FIG. 2 is a bottom view of the holder shown in FIG. 1 without flap and collar;

FIG. 3 is a longitudinal section of the second embodiment of a holder according to the invention;

FIG. 4 is a longitudinal section of a third embodiment of a holder according to the invention;

FIG. 5 shows a detail of FIG. 4;

FIG. 6 shows a variant of FIG. 4;

FIG. 7 shows a detail of FIG. 6; and

FIGS. 8 and 9 show two other embodiments of a holder according to the invention.

DESCRIPTION OF THE PREFERRED EMBODIMENTS

FIG. 1 is a longitudinal section of a preferably synthetic plastics holder 1, wherein a detection element 2 diagrammatically shown is embedded. At the bottom of the holder there is pivotally provided a flap 3 at one end at 4, which flap serves for clamping one of the ends of a band 6. In the closed position of the flap 3 shown, this is secured by lugs 5 (see also FIG. 2). For the purpose of clamping the free end of the band 6, the flap 3 is fitted adjacent the pivoted end with a boss 7 which, in the closed position of the flap 3, extends to adjacent a rib 8 of the holder 1 opposite to boss 7.

In the opened position of the flap 3, the band end can be passed freely between the boss 7 and the rib 8 and be pulled underneath the responder 2 and again be conducted at the other end of the responder through a slot 9 in the holder in outward direction. In closing the flap, the band is fixedly clamped between the boss 7 and the rib 8. The other end of the band (at the right-hand side in the drawing) has a looped form and is passed around a pin 10 installed in the holder, said pin being preferably designed as a shear pin.

The embodiment shown in FIG. 3 deviates from the embodiment shown in FIG. 2 in that the flap 3 is fitted with a cavity for receiving the responder 2. The responder may again be embedded in the cavity of the flap 3 and consequently be integral with the flap, but, as shown in FIG. 3, may also be provided with retaining lugs 11, which are adapted to detachably retain through snap action a loose responder block. The free band end in this embodiment is conducted along the top of the responder 2.

In the embodiment shown in FIGS. 4 and 5, the responder 2 is embedded in a cavity of the holder 1 or detachably installed therein as a responder block. Both ends of the band 6 with associated flaps 40, 41, which again are adapted for coaction with corresponding lugs 42, 43, can be fastened. To this effect, both band ends are inserted via slots 44, 45 in the holder, while said ends come to lie on the responder or the responder block. Above the slots 44 and 45, being provided at the opposite ends of the holder, there are provided transverse ribs 46, 47 of the holder, which are hollow at the bottom. In said cavities fit correspondingly curved half-round end edges 48 of the otherwise flat flaps, as shown in FIG. 5. The flaps, as shown by arrows 49, can be swivelled upwardly with their flat ends, while the curved end edges turn in the cavities of the ribs. The band ends, in the upwardly turned position of the flaps, are inserted in the holder and subsequently clamped with the free edge of the curved end edges of the flaps against the lower edge of the slots 44 and 45 by bringing the flaps in the position shown.

In order to increase the clamping effect, the free edges of the curved end edges of the flaps may be fitted with teeth 50, as shown in FIG. 5.

When in this embodiment a loose responder block is employed, the first portions of the flaps are so long that in the closed position they partly lie on the responder block, as shown in FIG. 4.

The maximum band pull force that can be exerted without loosening the band, is determined by the strength of the half-round end edges 48.

FIGS. 6 and 7 show a variant of FIGS. 4 and 5, in which the rotary flaps have been replaced by substantially flat slides 60, each having an end edge 61 bent at an angle slightly more than 90°. The ribs 62 of the holder corresponding to the ribs 46, 47 are now flat at the bottom and, together with the opposite lower edges of the slots 44, form a slightly wedge-shaped space accommodating the slides. The bent edge 61 of each slide is adapted for coaction with an ascending portion 63 of the lower edges of the slots 44 for clamping the band ends. To this effect, the bent edges 61 may again be fitted with teeth 64, as shown in FIG. 7.

When the band pull force exceeds a given value, the slide passes the ascending portion 63.

FIG. 8 shows a variant, in which instead of a slide 60, as shown in FIG. 7, there is employed a wedge 80 fitted at the bottom with teeth. The maximum band pull force is now determined by the ribs 62 designed as shear pins. In this embodiment, furthermore the responder block 2 is detachably retained in the appropriate cavity in the holder by retaining lugs 81, which are comparable with the retaining lugs 11 of FIG. 3.

FIG. 9 finally shows a variant in which the band ends are each provided between and about three ribs 90, 91 and 92 integral with the holder and designed as shear pins.

It is observed that after the foregoing, various modifications are obvious to one skilled in the art. For instance, the responder could be placed e.g. in a different position in the holder. Such modifications are deemed not to depart from the scope of the invention.

I claim:

1. A buckle for receiving an electronic detection element and for attaching a band about the neck or another part of the body of an animal, said buckle comprising:
   a holder frame,
   a cavity defined by said holder frame for receiving an electronic detection element,
   at least one clamping means for adjustably clamping one end of a band on said holder frame, and
   shear pin means mounted on said holder frame for attaching another end of said band to said holder frame, said shear pin means fracturing when a predetermined pulling force on the band is exceeded.

2. A buckle as claimed in claim 1, wherein said at least one clamping means includes a flap pivotably mounted on said holder frame, said flap includes a boss located adjacent to a pivoted end of said flap, said boss extends adjacent to a rib defined by said holder frame when said flap is in a closed position, said one end of said band being conducted through a slot defined by said holder frame and resting on said rib when said flap in in an open position, lugs defined by said holder frame retain a free end of said flap when said flap is in said closed position to hold said band between said boss and said rib.

3. A buckle as claimed in claim 1, further comprising an electronic detection element embedded in said cavity.

4. A buckle as claimed in claim 1, wherein said at least one clamping means includes three parallel interspaced cross members located at each of two opposite ends of said holder frame about which and between which a band end is installed and at least the cross members located adjacent to said two opposite ends are shear pins.

5. A buckle as claimed in claim 4, wherein said cross members are integral with said holder frame and are made of the same material as said holder frame.

6. A buckle for receiving an electronic detection element and for attaching a band about the neck or another part of the body of an animal, said buckle comprising:
   a holder frame;
   at least one clamping means for adjustably clamping one end of a band on said holder frame; and
   a cavity defined by said at least one clamping means for receiving an electronic detection element.

7. A buckle for receiving an electronic detection element and for attaching a band about the neck or another part of the body of an animal, said buckle comprising:
   a holder frame;
   a cavity defined by said holder frame for receiving an electronic detection element; and
   at least one clamping means for adjustably clamping one end of a band on said holder frame, and said at least one clamping means includes an inlet slot defined at each of two opposite ends of said holder frame for receiving an end of said band, each inlet slot being bounded one one side by a rib mounted on said holder frame which is hollow and semi-circular in shape, a semi-circular curved end edge of an otherwise flat flap is pivotally mounted in a cavity defined by said rib, a free edge of said curved end edge of said flap coacting with an edge of the slot located opposite to said rib for clamping an end of said band.

8. A buckle as claimed in claim 7, wherein said free edge of said curved end edge of the flap includes teeth.

9. A buckle as claimed in claim 7, wherein said curved end edge is a shear pin means.

10. A buckle as claimed in claim 7, wherein the flat portion of each flap covers at least a portion of said cavity when each of said flaps are in a closed position.

11. A buckle for receiving an electronic detection element and for attaching a band about the neck or another part of the body of an animal, said buckle comprising:
 a holder frame;
 a cavity defined by said holder frame for receiving an electronic detection element; and
 at least one clamping means for adjustably clamping one end of a band on said holder frame, and said at least one clamping means includes an inlet slot defined at each of two opposite ends of said holder frame for receiving an end of said band, one edge of each inlet slot being formed by a transversely extending rib and another edge of each inlet slot includes an ascending portion for coacting with an end edge, bent at an angle greater than 90°, of an otherwise flat flap for sliding underneath said transverse rib to clamp a band end with said bent end edge.

12. A buckle as claimed in claim 11, wherein the flat portion of each flap covers at least a portion of said cavity when each of said flaps are in a closed position.

13. A buckle for receiving an electronic detection element and for attaching a band about the neck or another part of the body of an animal, said buckle comprising:
 a holder frame;
 a cavity defined by said holder frame for receiving an electronic detection element; and
 at least one clamping means for adjustably clamping one end of a band on said holder frame, and said at least one clamping means includes an inlet slot defined at each of two opposite ends of said holder frame for receiving an end of said band, each inlet slot being bounded at its top by a transversely extending rib defined by the holder frame and at its bottom by a flat shoulder defined by the holder frame, a wedge-shaped clamping member is insertable in each inlet slot for clamping a band end against said flat shoulder and at least one of said transversely extending ribs is a shear pin.

14. A buckle as claimed in claim 13, wherein each wedge-shaped clamping member includes teeth at an end averted from said transversely extending rib.

15. A buckle for receiving an electronic detection element and for attaching a band about the neck or another part of the body of an animal, said buckle comprising:
 a holder frame;
 a cavity defined by said holder frame for receiving an electronic detection element;
 at least one clamping means for adjustably clamping one end of a band on said holder frame; and
 retaining lugs for retaining a block within said cavity, said block containing an electronic detection element.

* * * * *